US010826987B2

(12) United States Patent
D'Ercoli et al.

(10) Patent No.: US 10,826,987 B2
(45) Date of Patent: Nov. 3, 2020

(54) SYSTEMS AND METHODS FOR CONSENSUS-BASED DATA SECURITY FOR NETWORKED DEVICES

(71) Applicant: Datalogic IP Tech S.R.L., Calderara di Reno, Bologna (IT)

(72) Inventors: Francesco D'Ercoli, Bologna (IT); Simone Cilli, Bologna (IT); Marco Cumoli, Monte San Pietro (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 168 days.

(21) Appl. No.: 15/947,639

(22) Filed: Apr. 6, 2018

(65) Prior Publication Data

US 2019/0312928 A1    Oct. 10, 2019

(51) Int. Cl.
| H04L 29/08 | (2006.01) |
| H04L 29/06 | (2006.01) |
| H04L 9/08 | (2006.01) |
| H04L 9/06 | (2006.01) |

(52) U.S. Cl.
CPC ........ *H04L 67/1095* (2013.01); *H04L 9/0637* (2013.01); *H04L 9/0643* (2013.01); *H04L 9/0869* (2013.01); *H04L 63/12* (2013.01); *H04L 67/104* (2013.01); *H04L 67/12* (2013.01)

(58) Field of Classification Search
CPC . H04L 67/1095; H04L 9/0637; H04L 9/0643; H04L 9/0869

USPC ........................................................ 709/217
See application file for complete search history.

(56) References Cited

U.S. PATENT DOCUMENTS

| 2010/0037056 A1* | 2/2010 | Follis ................... G06F 11/1464 713/171 |
| 2017/0279783 A1* | 9/2017 | Milazzo ................ H04L 63/061 |
| 2018/0123882 A1* | 5/2018 | Anderson ........... H04L 41/0813 |
| 2018/0204213 A1* | 7/2018 | Zappier .................. H04L 63/08 |
| 2018/0343110 A1* | 11/2018 | Funk ..................... H04L 9/0618 |
| 2018/0365686 A1* | 12/2018 | Kondo ................. G06Q 20/382 |
| 2019/0305968 A1* | 10/2019 | Versteeg ................. H04L 63/12 |

OTHER PUBLICATIONS

Nakamoto, "Bitcoin: A Peer-to-Peer Electronic Cash System," available on the Internet at <<https://bitcoin.org/en/bitcoin-paper>>, retrieved on Apr. 19, 2018.
Erickson, Jon. "Exploitation." Hacking, the Art of Exploitation. No Starch Press, 2008. 116-193. Book.
Erickson, Jon. "Networking." Hacking, the Art of Exploitation. No Starch Press, 2008. 195-280. Book.

(Continued)

*Primary Examiner* — Meng Vang
(74) *Attorney, Agent, or Firm* — Foley & Lardner LLP

(57) ABSTRACT

Systems and methods for providing reliability and redundancy of data for networked nodes (e.g., sensors and/or actuators) is provided. Each sensor may operate as network node in the sensor network that may operate as a peer to peer (P2P) consensus network. Each network node may maintain its local copy of a data chain and may generate a data block for updating the data chain. After a threshold number of network nodes generate the same consensus block from the data block, each network node may update its local data chain by appending the consensus block thereto.

18 Claims, 12 Drawing Sheets

(56) References Cited

OTHER PUBLICATIONS

Erickson, Jon. "Cryptology." Hacking, the Art of Exploitation. No Starch Press, 2008. 393-449. Book.

Ferguson et al., "Hash Functions." Cryptography Engineering: Design Principles and Practical Applications. Wiley, 2010. 77-88. Book.

Ferguson et al., "Generating Randomness." Cryptography Engineering: Design Principles and Practical Applications. Wiley, 2010. 137-161. Book.

Ferguson et al., "Diffie-Hellman." Cryptography Engineering: Design Principles and Practical Applications. Wiley, 2010. 181-193. Book.

Ferguson et al., "RSA." Cryptography Engineering: Design Principles and Practical Applications. Wiley, 2010. 195-211. Book.

McClure et al., "Remote Connectivity and VoIP Hacking." Hacking Exposed. 6th Edition. McGraw Hill Education, 2012. 315-386. Book.

McClure et al., "Wireless Hacking." Hacking Exposed. 6th Edition. McGraw Hill Education, 2012. 445-491. Book.

McClure et al., "Hacking Hardware." Hacking Exposed. 6th Edition. McGraw Hill Education, 2012. 493-514. Book.

\* cited by examiner

US 10,826,987 B2

SYSTEMS AND METHODS FOR CONSENSUS-BASED DATA SECURITY FOR NETWORKED DEVICES

BACKGROUND

Networked nodes (e.g., sensors and/or actuators) have been increasingly popular in various applications. In an industrial setting, network sensors are used for monitoring various moving structures to ensure the safety of working personnel. Actuators are used in a variety of ways, including moving fluids, structures, and so on. In a healthcare setting, networked medical devices are used to construct a body area network (BAN) to monitor various parts of the human body. The networked sensors continuously generate critical data, which, if lost may present a grave danger to the safety of the personnel in an industrial setting or grave danger to health of a person in the case of a BAN. Therefore, a reliable and a redundant storage of the sensor generated data is required.

Conventional data storage systems and methods have several technical shortcomings. Perhaps the most used data storage system is a central repository, such as a database server, where all data sources pipe in gathered data for storage. However, the centralized system inherently generates a single point of failure. If the central repository faults or is maliciously attacked, the stored data may be lost or compromised. In other words, the centralized storage system neither grants reliability nor provides redundancy.

Distributed ledgers, which have been gaining popularity recently, also have several technical shortcomings when it comes to storing and maintaining data generated by sensor networks. For example, distributed legers are computation intensive. In a typical proof of work consensus mechanism, every node is in a race to solve a computationally heavy mathematical problem faster than the other nodes. Sensors do not have a large processing power to implement these methods involving intensive computations. Furthermore, the conventional distributed ledgers require a back end key infrastructure to implement their protocol. Sensors, which are generally aggregated as local area networks (LAN) may not have access to such infrastructure.

Therefore, conventional data storage technology may not be feasible or desirable for implementing networked sensors and/or actuators. As such, a significant improvement in data storage technology to generate a reliable and redundant database is desirable.

SUMMARY

A data block construction that is broadcast using a peer-to-peer (P2P) protocol amongst networked nodes, such as sensors and/or actuators, may provide a reliable and redundant data storage technology. The configuration of the data blocks may provide a data storage technology that does not require intense computations to maintain and update stored data. By using peer-to-peer communications, a data storage technology that does not have a single point of failure may be formed. Each of the sensors and actuators and/or other devices in the sensor network may operate as a network node in the peer-to-peer communications network, where each network node maintains its copy of a data chain inclusive of the data blocks, and all network nodes collaborating to generate consensus blocks for updating the data chain. In general, a combination of a distributed ledger with a shared trusted-criterion and consensus messages into a simple P2P protocol may be provided.

One embodiment of a method of providing data redundancy and reliability across multiple network nodes may include commissioning a set of network nodes by providing secret root information thereto during a node network commissioning phase. The first network node may generate a first data block containing a cryptographic hash derived from the secret root information and data generated or received by the first network node. The first data block may be broadcasted to at least a subset of the network nodes. A second data block generated by a second network node of the network nodes may be received by the first network node. A first consensus block may be generated based upon verifying the second data block. The first consensus block may be broadcast to at least a subset of the set of network nodes. The first network node may receive respective consensus blocks from one or more other network nodes of the network nodes. The first network node may update the data chain in response to determining that the number of consensus blocks including the first consensus block exceeds a threshold, such as more than a certain number (e.g., four) or percentage of nodes (e.g., more than 50 percent of the network nodes).

One embodiment of a system for providing data redundancy and reliability may include a plurality of network nodes, where a set of network nodes may be commissioned by receiving secret root information during a node network commissioning phase. A first network node of the set of nodes may include a processing unit configured to generate a first data block containing a cryptographic hash derived from the secret root information during a network commissioning phase, and data generated or received by the first network node. The first network node may also include a communications unit configured to broadcast the first data block to at least a subset of the network nodes, and receive a second data block generated by a second network node of the network nodes. The processing unit may be further configured to generate a first consensus block based upon verifying the second data block. Respective consensus blocks may be received via the communications unit from one or more other network nodes of the network nodes. The data chain may be updated by the processing unit in response to determining that the number of consensus blocks including the first consensus block exceeds a threshold.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1A:
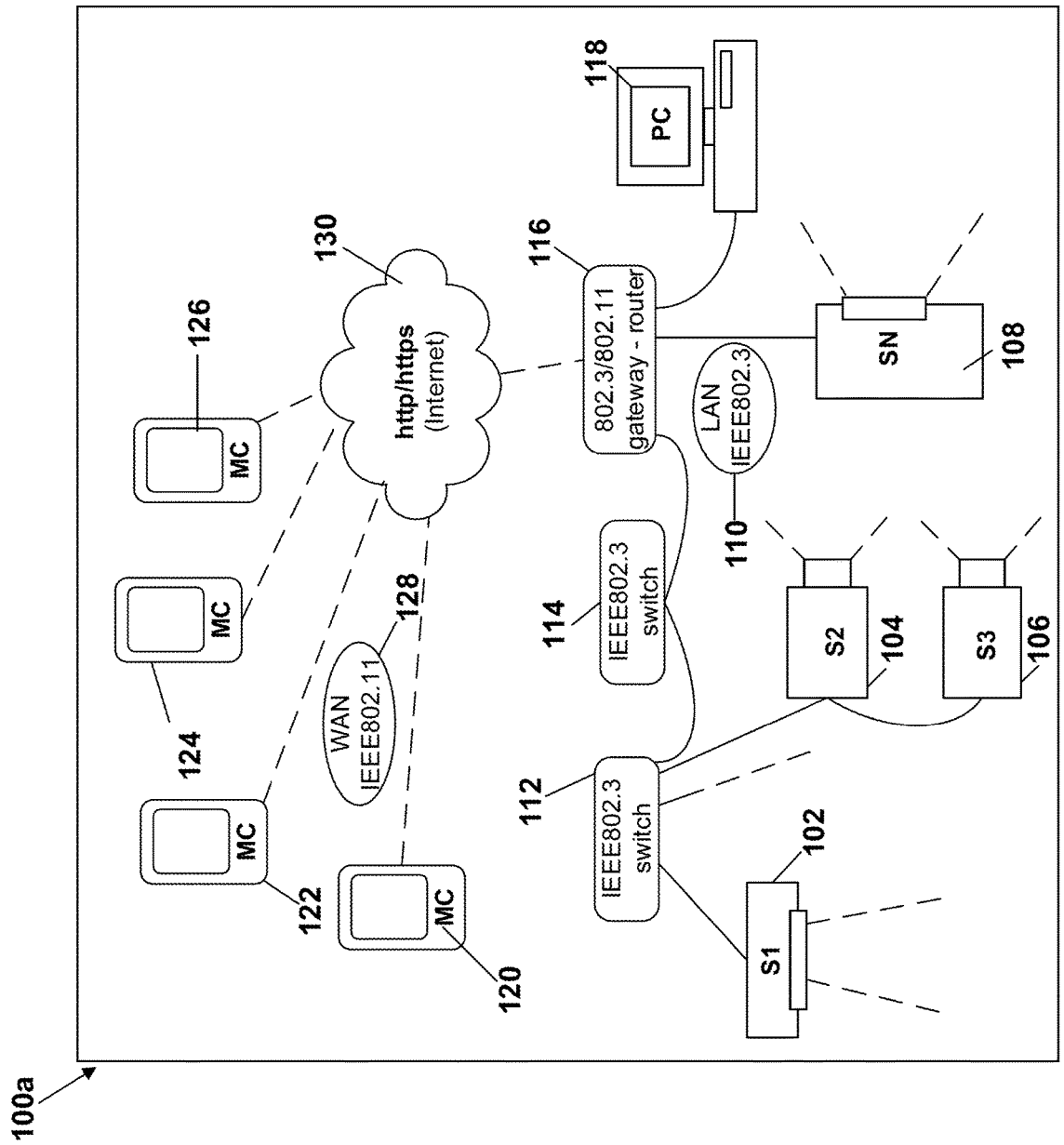
FIG. 1A is an illustration of an illustrative node (e.g., sensor and/or actuator) network environment in an industrial setting.

With regard to FIG. 1A, an illustration of an illustrative node (e.g., sensor and/or actuator) network environment 100a is shown. The nodes in the network environment may be any device configured to utilize the communications protocol, as described herein. The node network environment 100a may be for example, a safety sensor network in an industrial setting. The sensor network environment may include a plurality of heterogeneous types of sensors 102, 104, 106, 108 running on industrial Ethernet Local Area Network (LAN) 110 formed by Ethernet switches 112, 114. The sensors 102, 104, 106, 108 may each generate data blocks and exchange data blocks to generate a data chain through a peer-to-peer (P2P) network formed within the LAN 110. A personal computer 118 local to the LAN 110 and connected to the LAN 110 through a router 116 may function as a commissioning node during a startup phase of the P2P network. A plurality of mobile computers 120, 122, 124, 126 running on an external Wide Area Network (WAN) and connected to the LAN 110 through the Internet 130 may be used to check data in the data chain maintained by the sensors 102, 104, 106, 108 operating as network nodes in the P2P network. Even when one of the network nodes fails, other network nodes may have redundant copies of the data chain, thereby avoiding a single point of failure. For a safety network, such redundancy and reliability avoids single point failures in conventional systems lacking the redundancy, as is typical with trusted centralized controllers.

Figure 1B:
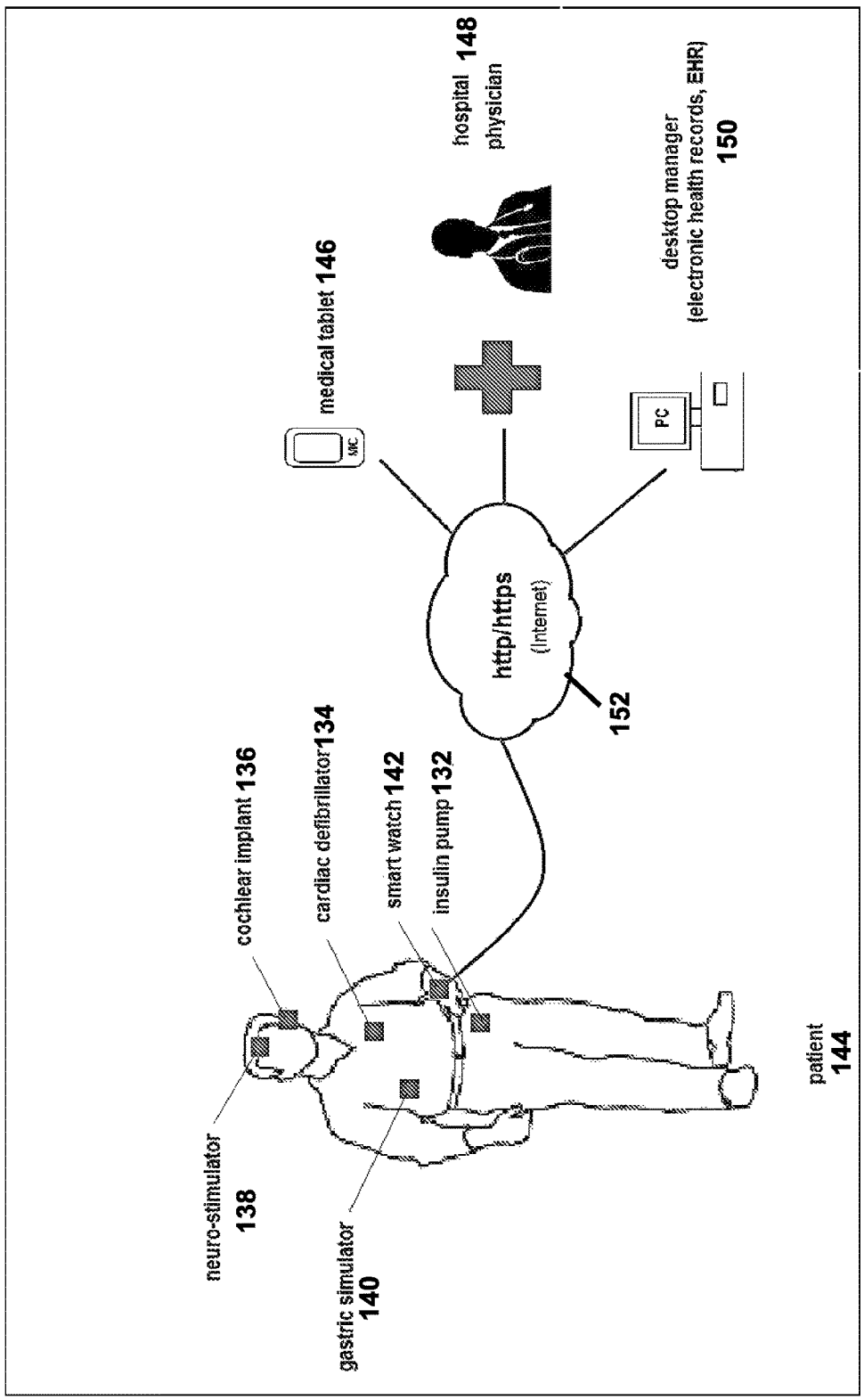
FIG. 1B is an illustration of an illustrative node network environment containing a body area network.

With regard to FIG. 1B, an illustration of an illustrative sensor network environment 100b is shown. The node network environment 100b may include a body area network (BAN) formed by implantable medical devices (IMDs) such as insulin pump 132, a cardiac defibrillator 134, a cochlear implant 136, a neuro-stimulator 138, and a gastric stimulator 140; and wireless devices such as a smart watch 142. The body area network may continuously and automatically manage (diagnose, regulation, treat, etc.) health conditions, such as cardiac arrhythmia, epilepsy, diabetes, Parkinson's disease of the patient 144, and so on. The illustrative sensor network environment 100b may be safety critical, and redundancy and reliability of the implanted medical devices 132, 134, 136, 138, 140 and the wireless device 142 forming the BAN, both in telemetry and control, helps ensure user safety. Consequences of a hack or fault in the network nodes formed by the medical devices 132, 134, 136, 138, 140 and the wireless device 142 may be severe and sometime fatal to the patient 144. Moreover, faults, resulting in damaged or unavailable data in continuous remote monitoring of patient physiological values, are generally more common for IMD/BANs in respect to industrial automation sensor networks, because of limited battery availability and transmission through the human body, which is a lossy medium. Embodiments disclosed herein enable a redundant, fault-tolerant data source, secure against intentional and unintentional data tampering. As all of the network nodes 132, 134, 136, 138, 140, 142 may maintain local copies of data, a single node failure may not result in the loss of the data. For example, if a physician 148 attempts to connect to the cardiac defibrillator 134 through the internet 152 to get a log file but the cardiac defibrillator 134 may be faulty (e.g., does not respond due to going offline or otherwise), then the physician 148 can connect to the insulin pump to get all data before the defibrillator 134 went offline. In another example, if a hacker locally falsifies data stored coming from a node (e.g., one of the network nodes 132, 134, 136, 138, 140, 142), data stored in the desktop manager 150, or data stored in the medical tablet 146, the physician 148 may rely on the trusted data chain stored by a majority of the nodes 132, 134, 136, 138, 140, 142 to check the integrity of the data, as further described herein.

Figure 2:
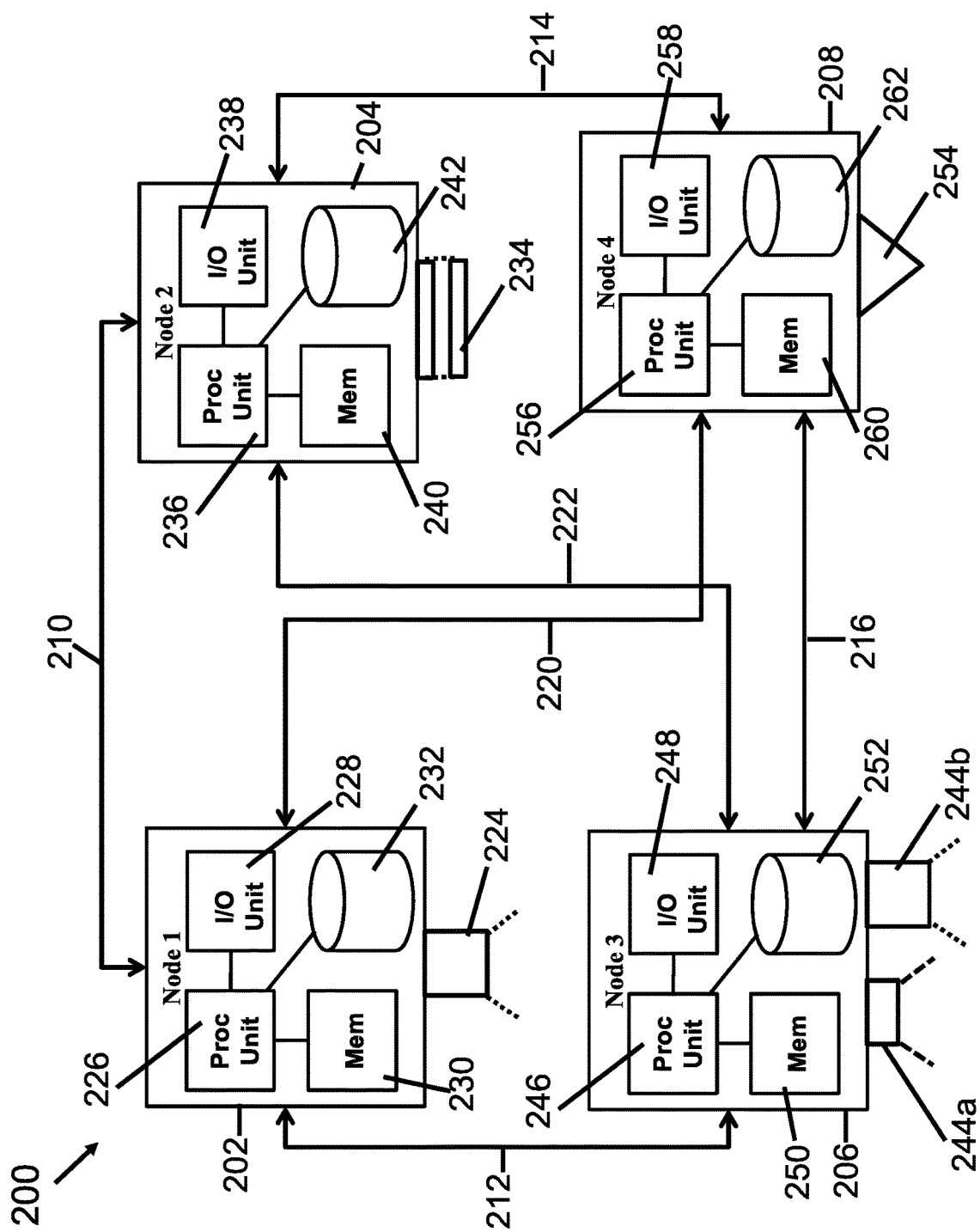
FIG. 2 is an illustration of an illustrative node network formed by heterogeneous sensors.

With regard to FIG. 2, an illustration of an illustrative node network 200 formed by illustrative nodes (e.g., sensors and/or actuators) 202, 204, 206, 208 is shown. The nodes 202, 204, 206, 208 may be interconnected through any means of wired or wireless connections 210, 212, 214, 216, 220, 222 forming a peer to peer (P2P) network. Each of the nodes 202, 204, 206, 208 may maintain a respective local copy of data chain and interchange messages with other sensors to update the respective local copy as new data blocks are generated.

The node 202 may comprise an imager 224, a processing unit 226, an input/output (I/O) unit 228, a non-transitory memory 230, and a storage unit 232. The imager 224 may be of any type including optical, laser, infrared, and/or any type of imager. The imager 224 may gather data from its environment by receiving any type of electromagnetic wave. For example, the imager 224 may capture optical and/or infra-red images, for example, of its environment. The processing unit 226 may include one or more processors of any type, where the processor(s) may receive raw data (such as an image) from the imager 224 and process the data. The processor(s) may also execute the one or more software modules implementing the various embodiments described herein for performing data chain communications. The non-transitory memory 230 may be any type of random access memory (RAM) from which the processing unit 226 may access raw or processed data and write one or more processor outputs thereto. The non-transitory memory 230 may further store a local copy of a data chain or a portion thereof, one or more data blocks, and/or one or more consensus blocks. The I/O unit 228 may handle communications with other devices, such as other nodes 204, 206, 208 and the Internet, and/or any other devices using one or more communications protocols, as understood in the art. The I/O unit 228 may receive and transmit various data blocks being exchanged and/or portions of data chains being exchanged. The storage unit 232 may store software modules implementing the embodiments disclosed herein. The storage unit 232 may further store a local copy of the data chain and/or one or more data blocks and consensus blocks.

The node 204 may include an actuator 234, a processing unit 236, an input/output (I/O) unit 238, a non-transitory memory 240, and a storage unit 242. The actuator 224 may be a mechanism configured to move and/or gather data related to physical actuation movement of the actuator 234. For example, the actuator 234 may detect when a door connected to the sensor 204 was opened or closed. The processing unit 236 may include one or more processors of any type, where the processor(s) may receive raw data from the actuator 234 and process the raw data. The processor(s) may also execute the one or more software modules implementing the various embodiments described herein. The non-transitory memory 240 may be any type of random access memory (RAM) from which the processing unit 236 may access raw or processed data and write one or more processor outputs thereto. The non-transitory memory 240 may further store a local copy of a data chain or a portion thereof, one or more data blocks, and/or one or more consensus blocks. The I/O unit 238 may handle communications with other devices, such as other sensors 202, 206, 208 and the Internet, and/or any other devices using one or more communications protocols, as understood in the art. The I/O unit 238 may receive and transmit various data blocks being exchanged and/or portions of data chains being exchanged. The storage unit 242 may store software modules implementing the embodiments disclosed herein. The storage unit 242 may further store a local copy of the data chain and/or one or more data blocks and consensus blocks.

The node 206 may include an illuminator 244a, an imager 244b, a processing unit 246, an input/output (I/O) unit 248, a non-transitory memory 250, and a storage unit 252. The illuminator 244a may provide an illumination to the immediate environment of the sensor 206 and the imager 244b may capture images of the area illuminated by the illuminator 244a. The processing unit 246 may include one or more processors of any type, where the processor(s) may receive raw data from the imager 244b and process the raw data. The processor(s) may also execute the one or more software modules implementing the various embodiments described herein. The non-transitory memory 250 may be any type of random access memory (RAM) from which the processing unit 246 may access raw or processed data and write one or more processor outputs thereto. The non-transitory memory 250 may further store a local copy of a data chain or a portion thereof, one or more data blocks, and/or one or more consensus blocks. The I/O unit 248 may handle communications with other devices, such as other nodes 202, 204, 208 and the Internet, and/or any other devices using one or more communications protocols, as understood in the art. The I/O unit 248 may receive and transmit various data blocks being exchanged and/or portions of data chains being exchanged. The storage unit 252 may store software modules implementing the embodiments disclosed herein. The storage unit 252 may further store a local copy of the data chain and/or one or more data blocks and consensus blocks.

The node 208 may comprise a probe 254, a processing unit 256, an input/output (I/O) unit 258, a non-transitory memory 260, and a storage unit 262. The probe 254 may gather various data such as chemical and/or biological data in the immediate environment of the sensor 208. The processing unit 256 may include one or more processors of any type, where the processor(s) may receive raw data from the probe 254 and process the raw data. The processor(s) may also execute the one or more software modules implementing the various embodiments described herein. The non-transitory memory 260 may be any type of random access memory (RAM) from which the processing unit 256 may access raw or processed data and write one or more processor outputs thereto. The non-transitory memory 260 may further store a local copy of a data chain or a portion thereof, one or more data blocks, and/or one or more consensus blocks. The I/O unit 258 may handle communications with other devices, such as other nodes 202, 204, 206 and the Internet, and/or any other devices using one or more communications protocols, as understood in the art. The I/O unit 258 may receive and transmit various data blocks being exchanged and/or portions of data chains being exchanged. The storage unit 262 may store software modules implementing the embodiments disclosed herein. The storage unit 262 may further store a local copy of the data chain and/or one or more data blocks and consensus blocks. It should be understood that the storage unit 262 may be any form of non-transitory memory.

Figure 3:
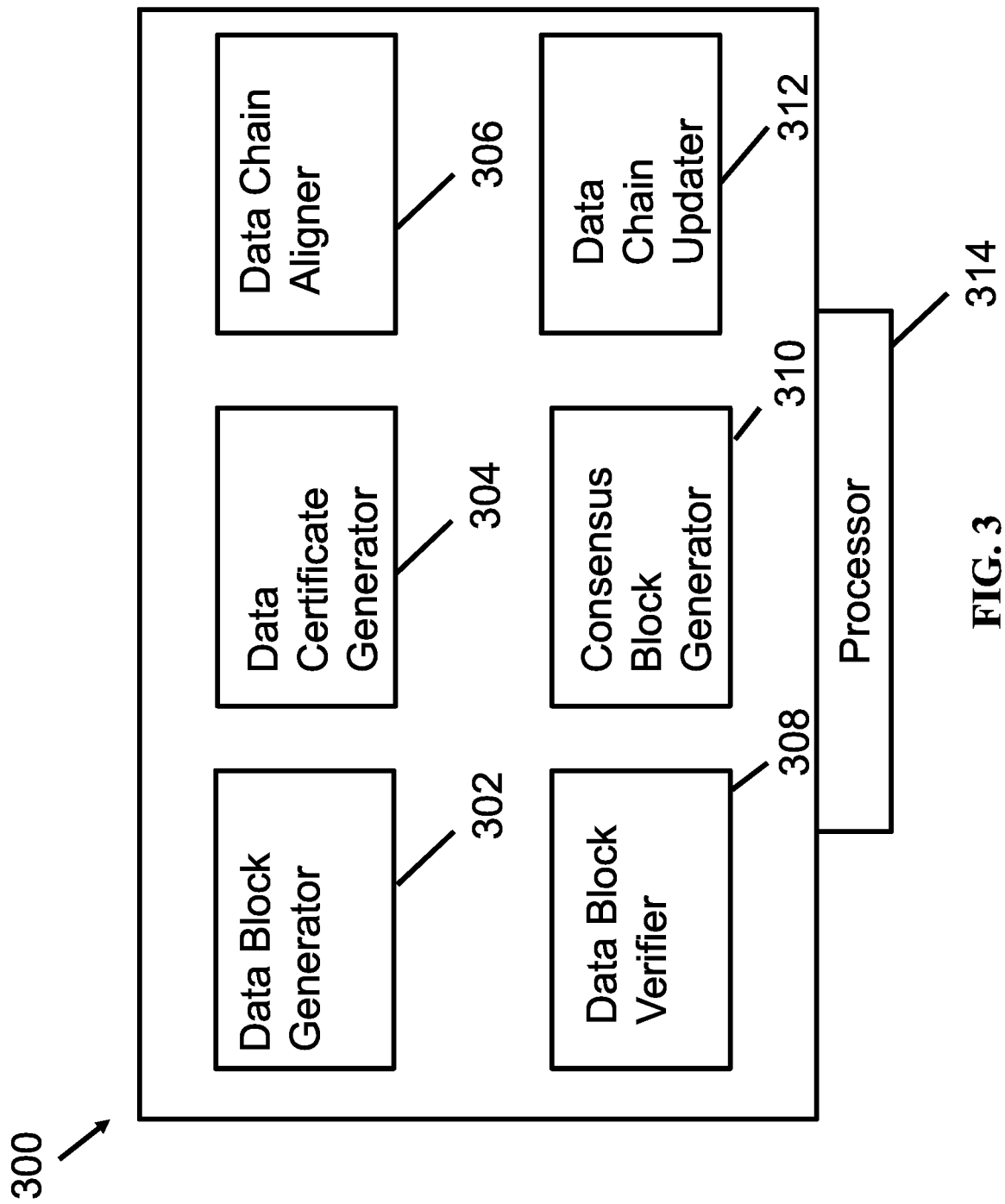
FIG. 3 is an illustration of illustrative software modules that may be executed by the nodes of FIG. 2, and be configured to provide reliability and redundancy of data according to principles described herein.

With regard to FIG. 3, a block diagram illustrative software modules 300 executable by each network node of FIG. 2 to perform data chain processing and communications is shown. The illustrative software modules 300 may include a data block generator module 302, a data certificate generator module 304, a data chain aligner module 306, a data block verifier module 308, a consensus block generator module 310, and a data chain updater module 312. The aforementioned software modules may be executed by a processor 314 of a network node. It should be understood that additional and/or alternative software modules 300 may be utilized. Moreover, alternative combinations of the software modules 300 may be utilized.

The data block generator module 302 may generate a data block from data generated by or received by the network node. More specifically, the data block generator module 302 may generate a hash of the last data block in the longest branch of a data chain, the data, a public key of the network node, and a data certificate of the network node. Other data in the block may also be included in performing the hash. The data block generator module 302 may encrypt the hash with a private key of the network node to generate a digital signature for the data block. The data block generator module 302 may then append the data and the public key to the digital signature to generate the data block.

The data certificate generator module 304 may generate a data certificate for a block based upon the secret root information provided to the network node during its commissioning. In some embodiments, the data certificate generator module 304 may use the secret root information as a seed to a pseudo-random number generator to generate the data certificate. A secret element may be derived from the secret root information. It should be understood that the secret information contained in the hash is the next nonce contained in the certificate, and that it is nearly impossible to obtain the secret root information (i.e., the seed) from the nonce.

The data chain aligner module 306 may align the local copy of the data chain in the network node when a received data block is unchainable with the local copy of the data chain. The data chain aligner module 306 may request one or more blocks from the source network node sending the data block until the local copy of the data chain is aligned with the local copy of the data chain the source network node. In operation, the alignment process may be performed after receiving the data block and before generation of a consensus.

The data block verifier module 308 may verify a received data block received by the network node. The data block verifier module 308 may decrypt the digital signature of the received data block to retrieve a hash value for the data block. The data block verifier module 308 may generate a hash value of the data and public key in the data block, the last data block of the aligned data chain, and the data certificate of the network node. If the data block verifier module 308 determines that the retrieved hash value is the same as the generated hash value, the data block verifier module may generate an indication that the received data block has been verified.

The consensus block generator module 310 may generate a consensus block from a verified data block by setting a bit in the data certificate. Furthermore, the consensus block generator module may use the asymmetric private/public key pair of the network node to generate the consensus block. The consensus block generator module 310 may then cause the network node to broadcast the consensus block. The data chain updater module 312 may append a data block to the local copy of the data chain after a consensus on a data block has been achieved.

One having ordinary skill in the art should understand that the respective functionality of the aforementioned software modules is merely illustrative and similar functionality may be achieved by different set of software modules. Furthermore, the software modules described herein may achieve alternative and additional functionality, which should be considered to be within the scope of this disclosure.

Figure 4:
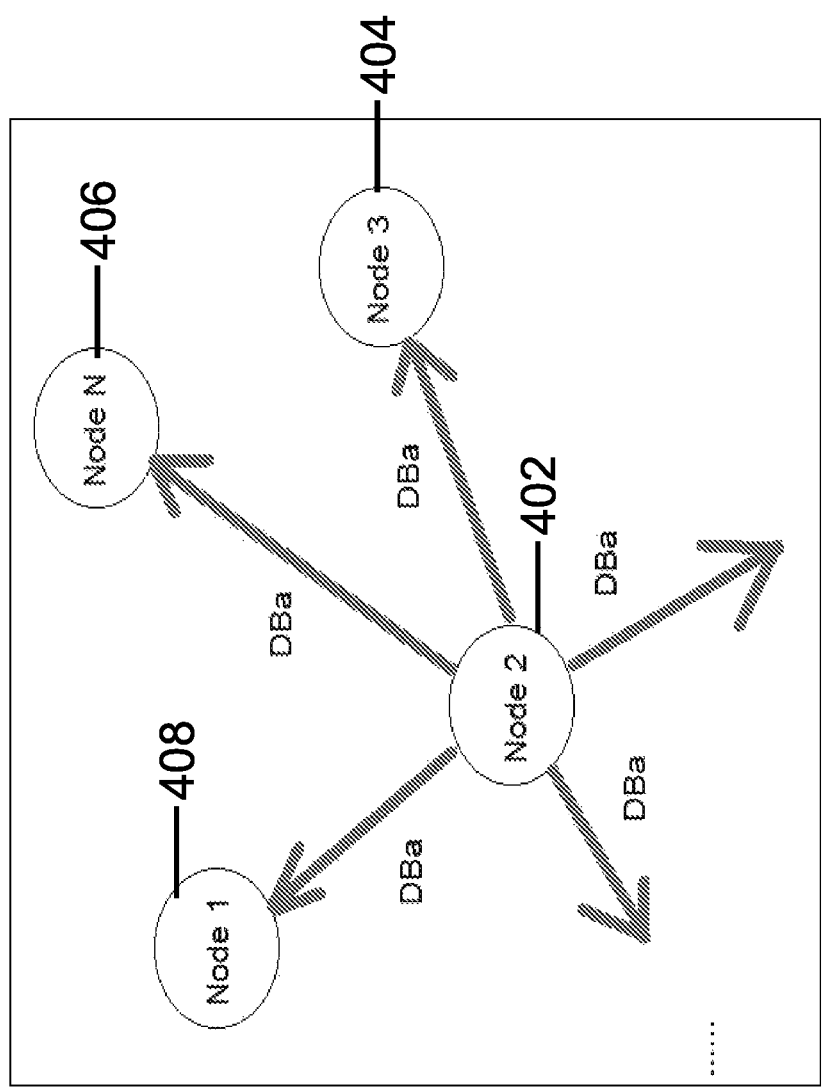
FIG. 4 is an illustration of an illustrative broadcast of a data block from a single network node to multiple network nodes.

With regard to FIG. 4, an illustration of an illustrative broadcast 400 of a data block DBa is shown. In an embodiment, a source node 402 may broadcast the data block Dba to multiple nodes includes nodes 404, 406, 408. The broadcast may use any data communications protocol as understood in the art. Each of the nodes 404, 406, and 408 may process the data block utilizing the software modules 300 of FIG. 3, for example.

Figure 5:
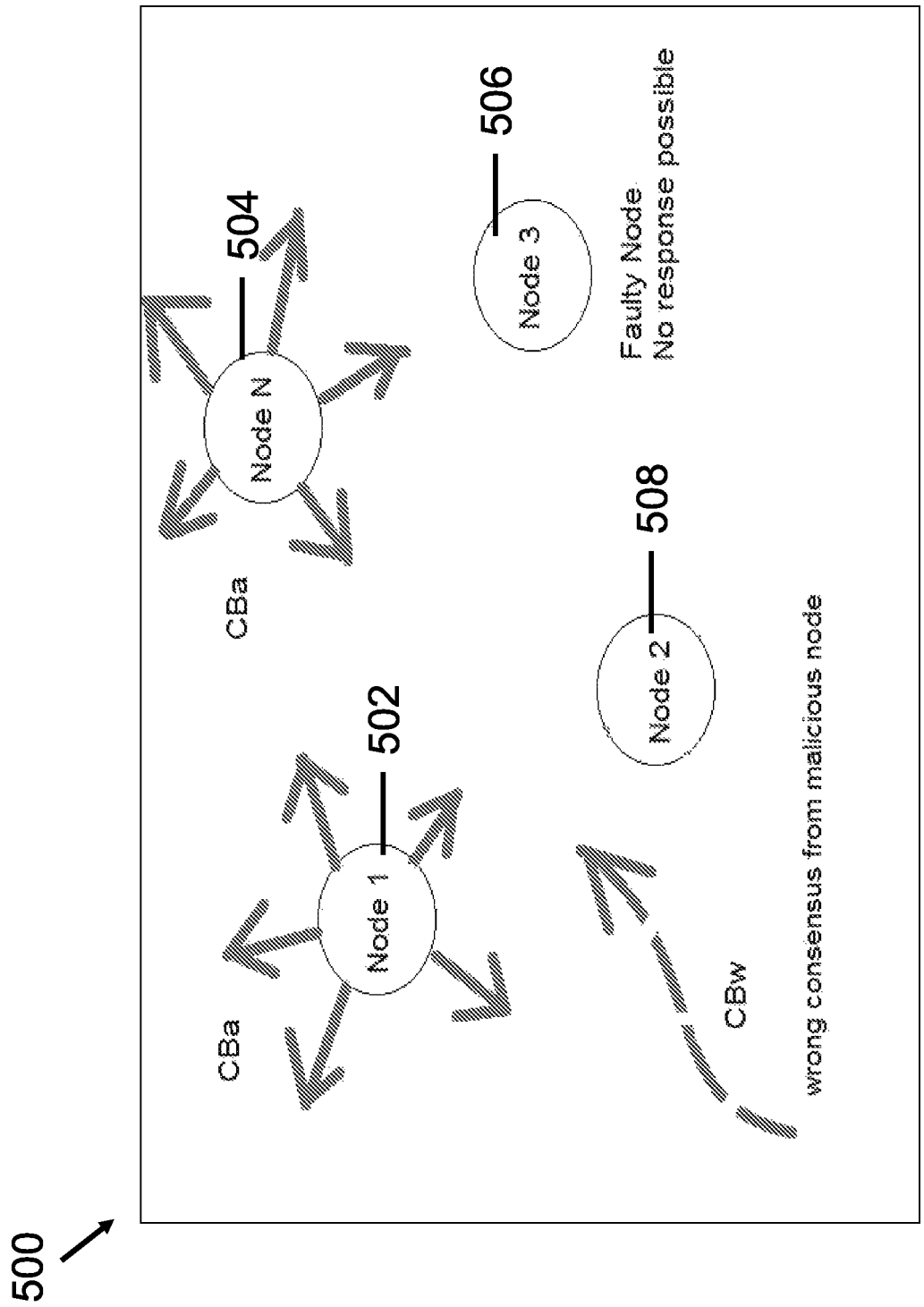
FIG. 5 is an illustration of an illustrative broadcast of a consensus block from multiple network nodes to multiple network nodes.

With regard to FIG. 5, an illustrative broadcast 500 of a consensus block CBa is shown. In an embodiment, each of nodes 502, 504 may broadcast the same consensus block CBa. Node 506 may be faulty node not capable of transmitting or receiving a consensus block CBa. Node 508 may not be faulty and may receive the consensus block CBa from at least one or the nodes 502, 504. A malicious node (not shown) may generate and transmit a wrong consensus block CBw. However, as described below, as malicious node may not have access to a data certificate in the network and other nodes may determine that the consensus node CBw is wrong because of the incorrect certificate contained therein. In response to determining that the consensus node is wrong, the nodes 504, 506, 508 may ignore the consensus, thereby improving reliability and security.

Figure 6:
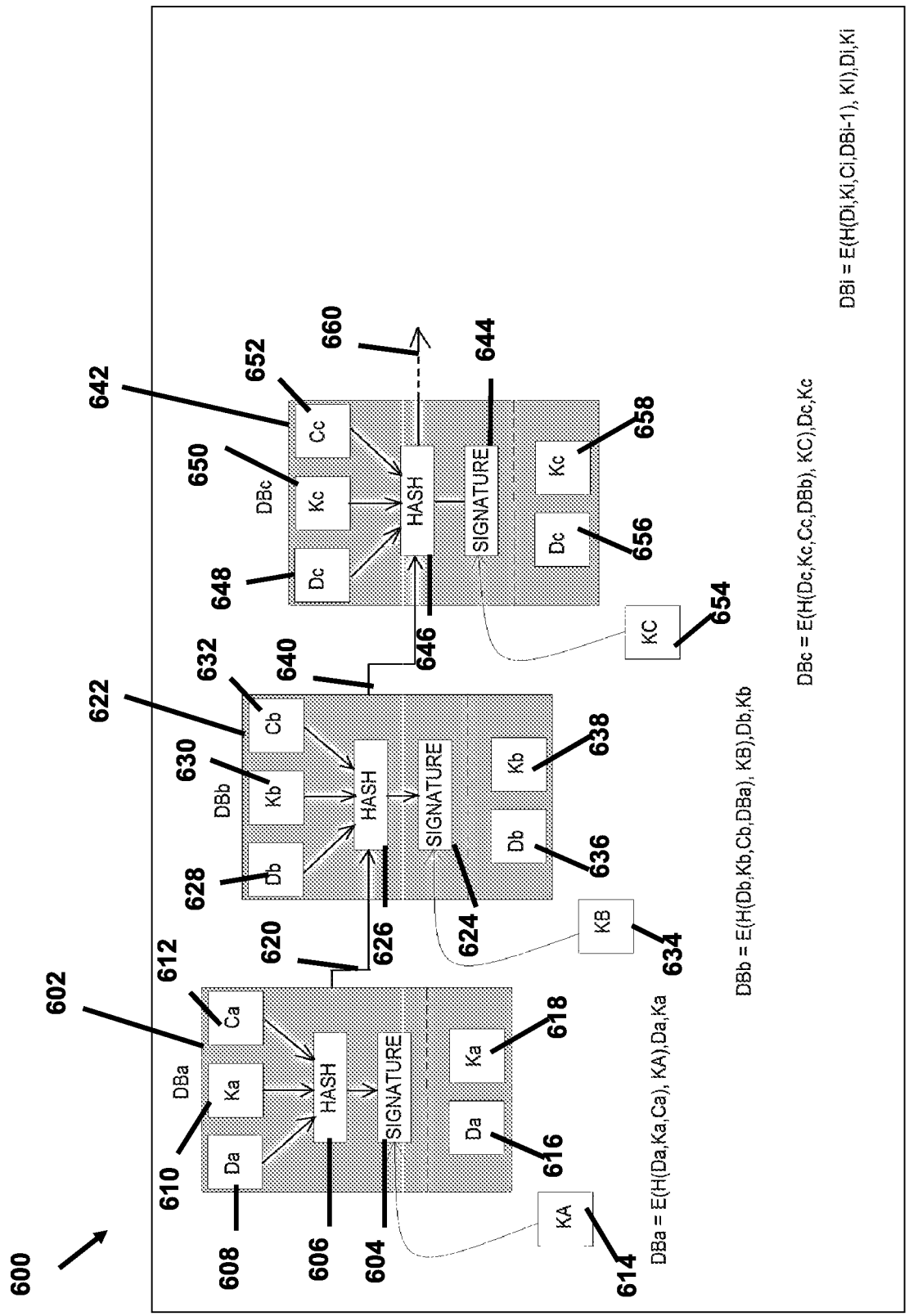
FIG. 6 is an illustration of an illustrative data chain containing illustrative data blocks.

With regard to FIG. 6, an illustration of an illustrative data chain 600 containing a first illustrative data block 602, a second illustrative data block 622, and a third illustrative data block 642 is shown. The first data block 602 may have been generated by a first network node, the second data block 622 may have been generated by a second network node, and the third data block 642 may have been generated by a third network node. However, one having ordinary skill in the art should understand that the description of the first, second, and third network nodes each generating a respective data block of data blocks 602, 622, 642 is merely for the ease of explanation and should not be construed as limiting. For example, a single network node may generate all of the data blocks 602, 622, 642. More generally, the data blocks 602, 622, 642 may have been generated by any combination of one to three network nodes.

The first data block 602 may include a digital signature 604, which may be an encrypted hash 606 of data 608 generated or received by the first network node, public key 610 of the first network node, and private data certificate 612 of the first network node. The hash 606 may be encrypted by using private key 614 of the first network node. One having ordinary skill in the art should understand that the public key 610 and the private key 614 may form an asymmetric public/private key pair for the first network node. In some embodiments, the hash 606 may be generated using the Secure Hash Algorithm 3 (SHA-3) as understood in the art. In addition to the digital signature 604, the first data block 602 may include data 616 generated or received by the first network node and public key 618 of the first network node. It should be understood that the data 608 and data 616 may be the same data and the public key 610 and public key 618 may the same public key, but they have been labeled separately to show the hashed and encrypted data 608 and public key 610 within the digital signature 604 and unencrypted and unhashed data 616 and public key 618 appended after the digital signature 604 in the first data bock 602. In other words, the first data block (DB a) 602 may be mathematically represented in terms of the data (Da) 608, 616; public key (Ka) 610, 618; and private data certificate (Ca) 612, private key (KA) 614 as:

$$DBa = E(H(Da, Ka, Ca), KA), Da, Ka$$

The second data block 622 may include a digital signature 624, which may be an encrypted hash 626 of data 628 generated or received by the second network node, public key 630 of the second network node, private data certificate 632 of the second network node, and the first data block 602. Hashing of the first data block 602 together with the data 628, public key 630, and private data certificate 632 may generate a connection 620 between the first data block 602 and the second data block 622. The hash 626 may be encrypted by using private key 634 of the second network node. One having ordinary skill in the art should understand that the public key 630 and the private key 634 may form an asymmetric public/private key pair for the second network node. In some embodiments, the hash 626 may be generated using the Secure Hash Algorithm 3 (SHA-3) as understood in the art. In addition to the digital signature 624, the second data block 622 may include data 636 generated or received by the second network node and public key 638 of the second network node. It should be understood that the data 628 and data 636 may be the same data and the public key 630 and public key 638 may the same public key, but they have been labeled separately to show the hashed and encrypted data 628 and public key 630 within the digital signature 624 and unencrypted and unhashed data 636 and public key 638 appended after the digital signature 624 in the second data bock 622. In other words, the second data block (DBb) 622 may be mathematically represented in terms of the first data block (DBa) 602; data (Db) 628, 636; public key (Kb) 630, 638; and private data certificate (Cb) 632, private key (KB) 634 as:

$$DBb = E(H(Db, Kb, Cb, DBa), KB), Db, Kb$$

The third data block 642 may include a digital signature 644, which may be an encrypted hash 646 of data 648 generated or received by the third network node, public key 650 of the third network node, private data certificate 652 of the third network node, and the second data block 622. Hashing of the second data block 622 together with the data 648, public key 650, and private data certificate 652 may generate a connection 640 between the second data block 622 and the third data block 642. The hash 646 may be encrypted by using private key 654 of the third network node. One having ordinary skill in the art should understand that the public key 650 and the private key 654 may form an asymmetric public/private key pair for the third network node. In some embodiments, the hash 646 may be generated using the Secure Hash Algorithm 3 (SHA-3) as understood in the art. In addition to the digital signature 644, the third data block 642 may include data 656 generated or received by the second network node and public key 658 of the second network node. It should be understood that the data 648 and data 656 may be the same data and the public key 650 and public key 658 may be the same public key, but they have been labeled separately to show the hashed and encrypted data 648 and public key 650 within the digital signature 644 and unencrypted and unhashed data 656 and public key 658 appended after the digital signature 644 in the third data bock 642. In other words, the third data block (DBc) 642 may be mathematically represented in terms of the second data block (DBb) 622; data (Dc) 648, 656; public key (Kc) 650, 658; and private data certificate (Cc) 652, private key (KC) 654 as:

$$DBc=E(H(Dc,Kc,Cc,DBb),KC),Dc,Kc$$

Figure 7:
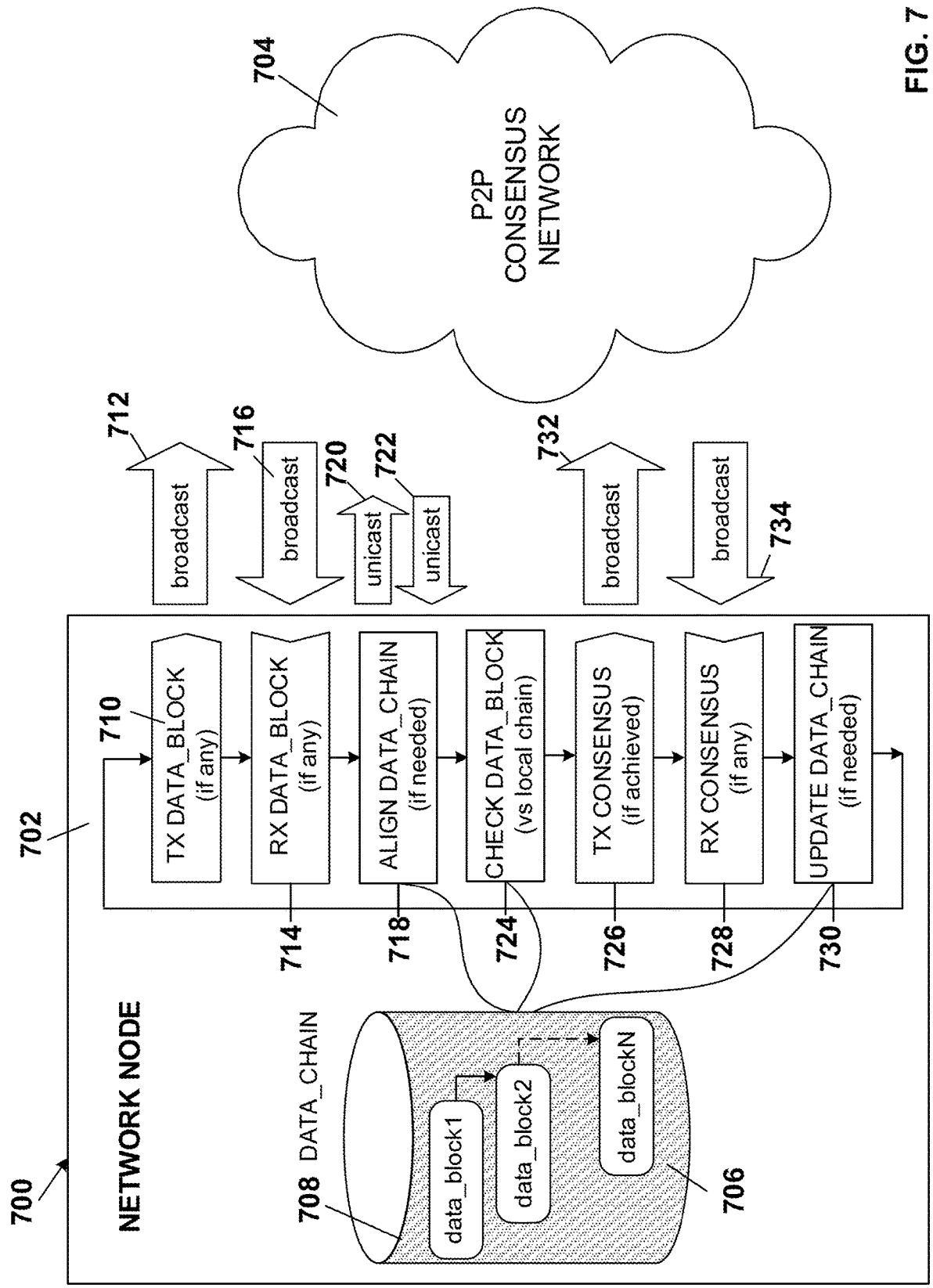
FIG. 7 is an illustrative flow diagram of an illustrative process of providing redundancy and reliability of data across multiple network nodes.

FIG. 7 is an illustrative flow diagram 700 of an illustrative process of providing redundancy and reliability of data across multiple network nodes. As described herein, a network node 702 may implement the process in cooperation with a peer to peer (P2P) consensus network 704. During the process, the network node 702 may maintain a data chain 706 in storage 708. If the network node 702 does not have a data chain 706, the network node 702 may download the data chain 706 from a node in the P2P consensus network 704 prior to beginning the process 700.

The process 700 may begin at step 710, wherein the network node 702 may generate and transmit a data block to the P2P consensus network 704. The network node 702 may generate the data block from a data that may be locally produced by the network node 702 or remotely received by the network node 702. From the data, the network node 702 may generate the data block by computing a hash value, applying a digital signature, and append the data with the public key, as described above. In case the data chain 706 is branched, the network node 702 may use the longest branch to build the hash value in the data block. In other words, the network node 702 may use the last data block of the longest branch when computing the hash value for the data block. The network node 702 may then broadcast 712 the generated data block to the P2P consensus network 704. The content of the generated and transmitted data block is detailed in the description of FIG. 8 below.

In step 714, the network node 702 may receive one or more data blocks broadcasted 716 by one or more network nodes in the P2P consensus network 704. It should be understood that not all the data blocks broadcasted by the network nodes in the P2P consensus network 704 may arrive at the network node 702. Furthermore, the data blocks may arrive at the network node 702 at unpredictable time orders. For example, a more recent data block may arrive at the network node sooner than an older data block. In step 718, the network node 702 may align the data chain 706 with the data chain of at least one network node in the P2P consensus network 704 that has transmitted a data block received by the network node. The alignment process has been described below with regard to FIG. 9. The alignment process may include one or more unicast transmissions 720 from the P2P consensus network 704 to the network node 702 and/or one or more unicast transmissions 722 from the network node 702 to the P2P consensus network 704.

In step 724, the network node 702 may check a received data block against the data chain 706 stored in the memory 708. The network node 702 may read the unencrypted data and the public key in the data block and determine the expected value of the data certificate of the source network node (within the P2P consensus network 704) generating the received data block. The network node 702 may further decrypt the digital signature in the data block using the unencrypted public key in the data block to generate a decrypted hash value of the data block. The network node 702 may hash the unencrypted data, the public key, and the expected value of the data certificate together with a data block in the data chain 706 to generate a hash value. The network node 702 may compare the decrypted hash value with the generated hash value. If the comparison returns a match, the network node 702 may determine that the data block is valid. The network node 702 may repeat the process of hash generation and comparison for multiple data blocks in the data chain 706 until a match is found to determine that the data block is valid or until all the data blocks in the data chain 706 exhausted. If the network node 702 determines that there is no match and that all the data blocks in the data chain 706 are exhausted, the network node 702 may determine that the received data block is invalid and ignore the data block. It should also be understood that the network node 702 may perform the aforementioned process separately for each of multiple data blocks received from the P2P consensus network 704.

If the network node 702 determines that a received data block is indeed valid against the local data chain 706, the network node may generate a consensus block from the received data block and, in step 726, broadcast 732 the consensus block to the P2P consensus network 704. The process of generating a consensus block from a valid data block is detailed in regard to FIG. 10 below.

In step 728, the network node 702 may receive a plurality of consensus blocks broadcasted 734 by multiple network nodes in the P2P consensus network 704. The network node 702 may count the received consensus blocks. The network node may count the received consensus blocks and determine that a consensus has been reached when the number of consensus blocks exceed a certain threshold. For example, a threshold may be 50% of the network nodes generating the same consensus block. In some embodiments, the network node may determine that a consensus has been reached when the number of consensus blocks reach a certain quota. For example, in a P2P consensus network 704 with an unknown number of network nodes, the network node may determine that a consensus has been reached when four of the same consensus blocks have been received at the network node. Any other number may be used to determine if a consensus has been determined. If a consensus has been reached, the network node 702, in step 730, may update the data chain 706 appending consensus blocks to the data chain 706.

Figure 8:
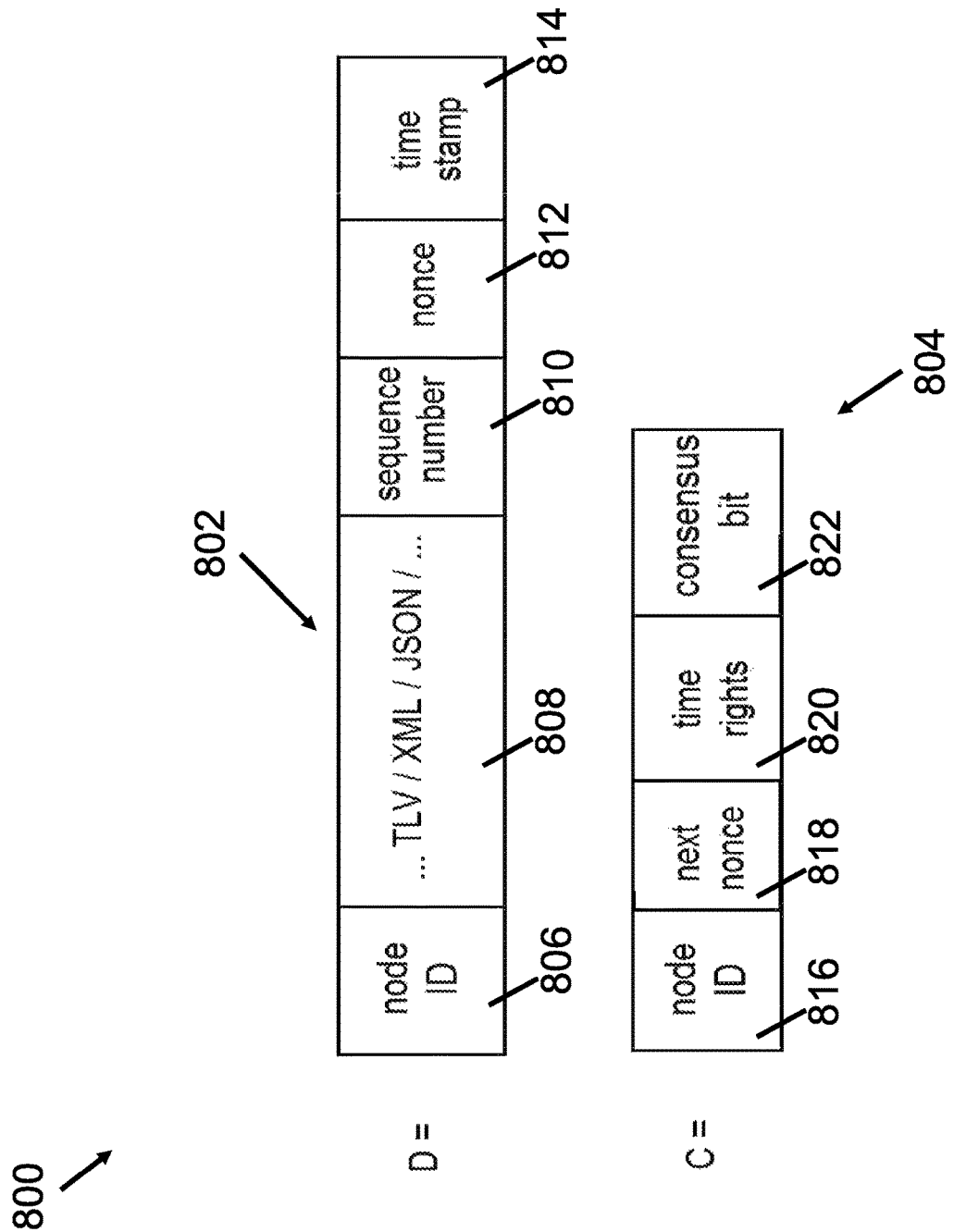
FIG. 8 is an illustration of illustrative information pieces coded in a data block format.

With regard to FIG. 8, illustrative information pieces 800 coded in a data block are shown. The information pieces 800 may include data 802 and a data certificate 804. As described above, the data 802 and the data certificate 804 may be included in the data block as an encrypted hash functioning as a digital signature. Furthermore, the data 802 may be appended unencrypted to the digital signature in the data block. The data 802 may include at least a node identification (ID) 806, payload 808, a sequence number 810, a nonce 812, and a time stamp 814. The data certificate 804 may include a node ID 816, a next nonce 818, time rights 820, and a consensus bit 822.

In the data 802, the node ID 806 may be a unique value that identifies a source. The unique value may be an alphanumeric value. The payload 808 may be the actual substantial information in the data 802. The payload 808 may be any format, such as time-length-value (TLV), Extensive Markup Language (XML), and/or JavaScript Object Notation (JSON). The sequence number 810 may be used to uniquely identify the data 802 produced from the source network node. The nonce 812 may be related to the local secret root information of the network node that generated the data 802. The nonce 812 may be, for example, a random number corresponding to the sequence number 810 in the data 802. The time stamp 814 may be the time stamp of generation of the data block including the data 802. The time stamp 814 may be used for synchronizing the network nodes within a peer to peer (P2P) network. Such synchronization may help in managing local data chains by the respective network nodes because different trusted data blocks available on a network node can be chained to the respective data chain in an ascending time order.

In the data certificate 804, the node ID 816 may be a unique value that may identify a source network node that generated the data 802 and/or the data block containing the data 802. The node ID 816 may be the same as node ID 806. The next nonce 818 may be related to the data 802 produced by the source network node. The next nonce 818 may be known only by the commissioned network nodes in the P2P network. For example, the next nonce 818 may be the random number corresponding to the next sequence number succeeding the sequence number 810 in the nonce sequence generated using the secret root information obtained in the initial commissioning phase. The time rights 820 may implement an additional validation check against the time stamp 814. The consensus bit 822 may be a binary indicator whether the data block containing the data 802 is a consensus block. For example, a receiving network node may set the consensus bit 822 to signal that there is a consensus for the data block containing the data 802.

Figure 9:
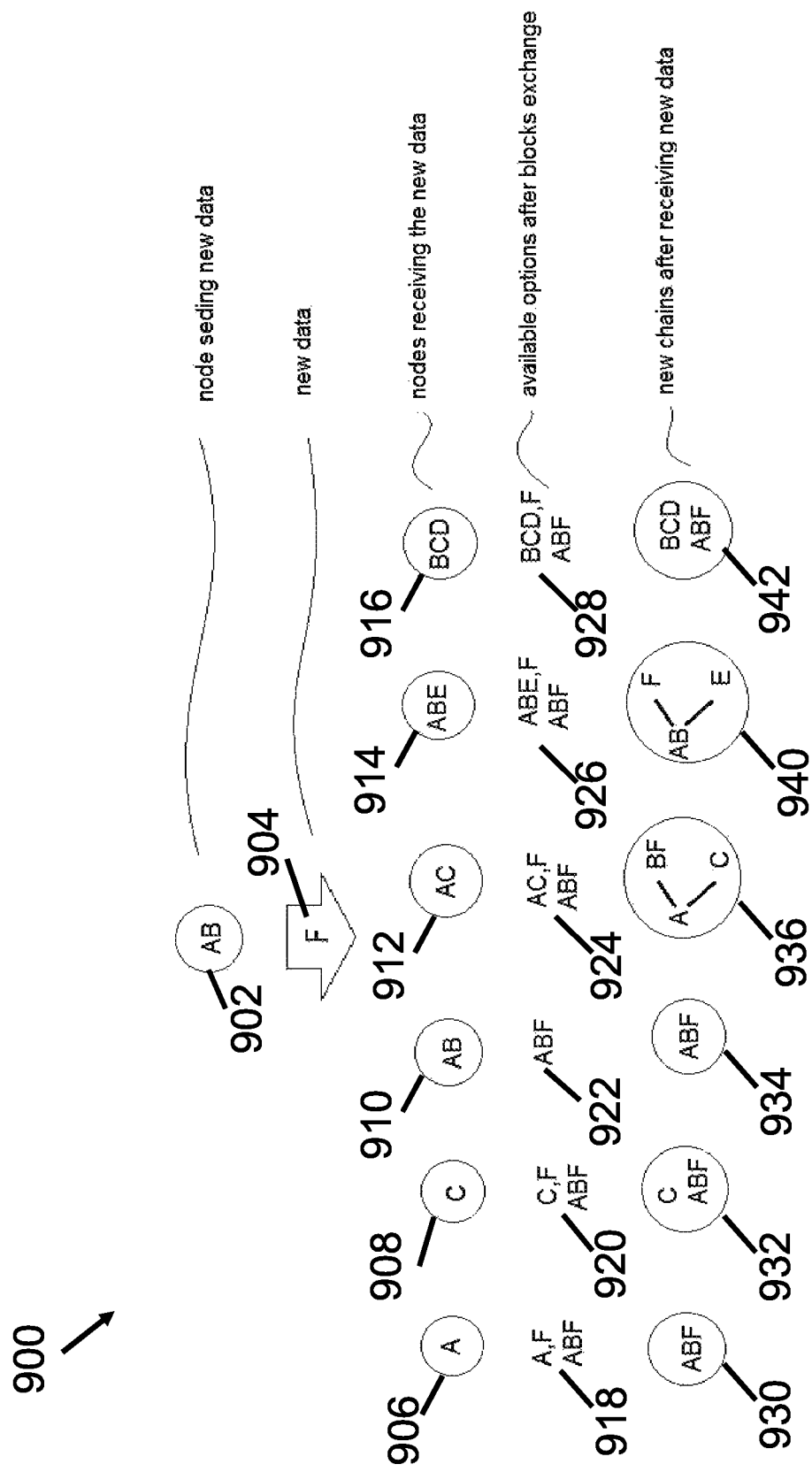
FIG. 9 is an illustration of an illustrative flow diagram of data chain alignment process.

With regard to FIG. 9, a flow diagram of an illustrative data chain alignment process 900 is shown. The process 900 may begin when a network node 902 transmits a new data block 904 to each of the network nodes 906, 908, 910, 912, 914, 916. The local data chain in the transmitting network node 902 may be, for example, AB (i.e. a first data block A connected to a second data block B). The new data block 904 may be, for example, a data block F. To check the validity of the data block F, each of the receiving network nodes 906, 908, 910, 912, 914, 916 may have to align their local data chains with the data chain of the transmitting network node 902. The alignment process 900 may be used because each of the receiving network nodes 906, 908, 910, 912, 914, 916 has different versions of the local data chains. In other words, the network nodes 902, 906, 908, 910, 912, 914, 916 have different understanding of the state of the network, and may have to come to a common understanding or alignment before moving further.

The network node 906 may have a local data chain containing a data block A. The network node 906, upon receiving the block F, may determine that F is not chainable to A. Therefore, network node 906 may request the transmitting network node 902 send its local copy of the data chain. The transmitting network node 902 may then transmit its local data chain containing chained data blocks AB. As F is chainable to AB as F was generated by the transmitting network node 902 to be chainable to AB in the first place, the network node 906 may update its local data chain with ABF to generate a new data chain 930. In other words, out of the options 918 of unchainable and shorter AF and longer and chainable ABF, the network node 906 may select the chainable ABF as the new data chain 930. It should be understood that the network node 906 may maintain in its memory all its known data blocks A, B, and F.

The network node 908 may have a local data chain containing a data block C. Upon receiving the data block F, the network node 908 may determine that F is not chainable to C. Therefore, the network node 908 may request the transmitting network node 908 transmit its local data chain to the network node 908. Once the network node 908 receives the local chain from transmitting network node 902, the network node 908 may determine that there may two options 920 for updating its local data chain. As F is not chainable to C, network node 908 may request the transmitting network node 902 send its local copy of the data chain. The transmitting network node 902 may then transmit its local data chain containing chained data blocks AB. Further, as the network node 908 may not lose any data block it knows of, the network node 908 may maintain a second local data chain containing data block C. Therefore, the new data chain 932 generated by the network node 908 may include a shorter data chain C and longer data chain ABF.

The network node 910 may have a local data chain AB containing data blocks A and B. Upon receiving the data block F, the network node 910 may determine that F is chainable to AB. Therefore, the network node 910 may not have to request the transmitting network node 902 transmit its local data chain. The network node 910 may have a single option 922 for updating its data chain in light of receiving the new data block. The new data chain 934 may therefore have the data blocks A, B, and F chained as ABF as result of the network node 910 receiving the new data block F from the transmitting network node 902.

The network node 912 may have a local data chain AC containing data blocks A and C. Upon receiving the new data block F, the network node 912 may determine that the new data block F may not be chainable to AC. Therefore, the network node 912 may request the transmitting network node 902 transmit its local data chain to the network node 912. Once the network node 912 receives the local data chain AB from the transmitting network node 902, the network node 912 may determine there may be two options 924 of AC, F and ABF for updating its local data chain. However, as F is not chainable to AC, the network node may generate a new data chain 936 containing two branches ABF and AC.

The network node 914 may have a local data chain ABE containing data blocks A, B, and E. Upon receiving the new data block F from the transmitting network node 902, the network node 914 may determine that F is not chainable to ABE. Therefore, the network node 914 may request the transmitting node 902 to transmit its local data chain. Once the network node 914 receives the local data chain AB of the transmitting network node 902, the network node 914 may determine that it has two options 926 of ABE, F and ABF. Because no data block can be lost during the local data chain alignment process, the network node 914 may generate a new data chain 940 with two branches ABF and ABE.

The network node 916 may have a local data chain BCD containing data blocks B, C, and D. Upon receiving the new data block F from the transmitting network node 902, the network node 916 may determine that the new data block F may not be chainable to BCD. Therefore, the network node 916 may request the transmitting network node 902 to transmit its local data chain. Once the network node 916 receives the local data chain AB of the transmitting network node 902, the network node 916 may determine there are two options 928 of BCD, F and ABF. As F is not chainable to BCD and no data block can be lost, the network node 916 may generate an updated data chain 942 containing two data chains BCD and ABF.

One having ordinary skill in the art should understand that the aforementioned exchanges of data blocks or data chains are merely illustrative and should not be considered to limit the scope of this disclosure. More particularly, the description of each of the network nodes 906, 908, 912, 914, 916 requesting the transmitting network node 902 to transmit its local copy of the data chain is merely for the ease of explanation. Each of the network nodes 906, 908, 912, 914, 916 may more generally request data blocks from the local data chain or a portion of the local data chain of the transmitting network node 902 until each respective receiving node finds an alignment. In other words, there may be block exchanges between the receiving network nodes 906, 908, 912, 914, 916 and the transmitting network node 902 until an alignment of the data chain between each of the receiving network nodes 906, 908, 912, 914, 916 and the transmitting network node 902 is reached.

Figure 10:
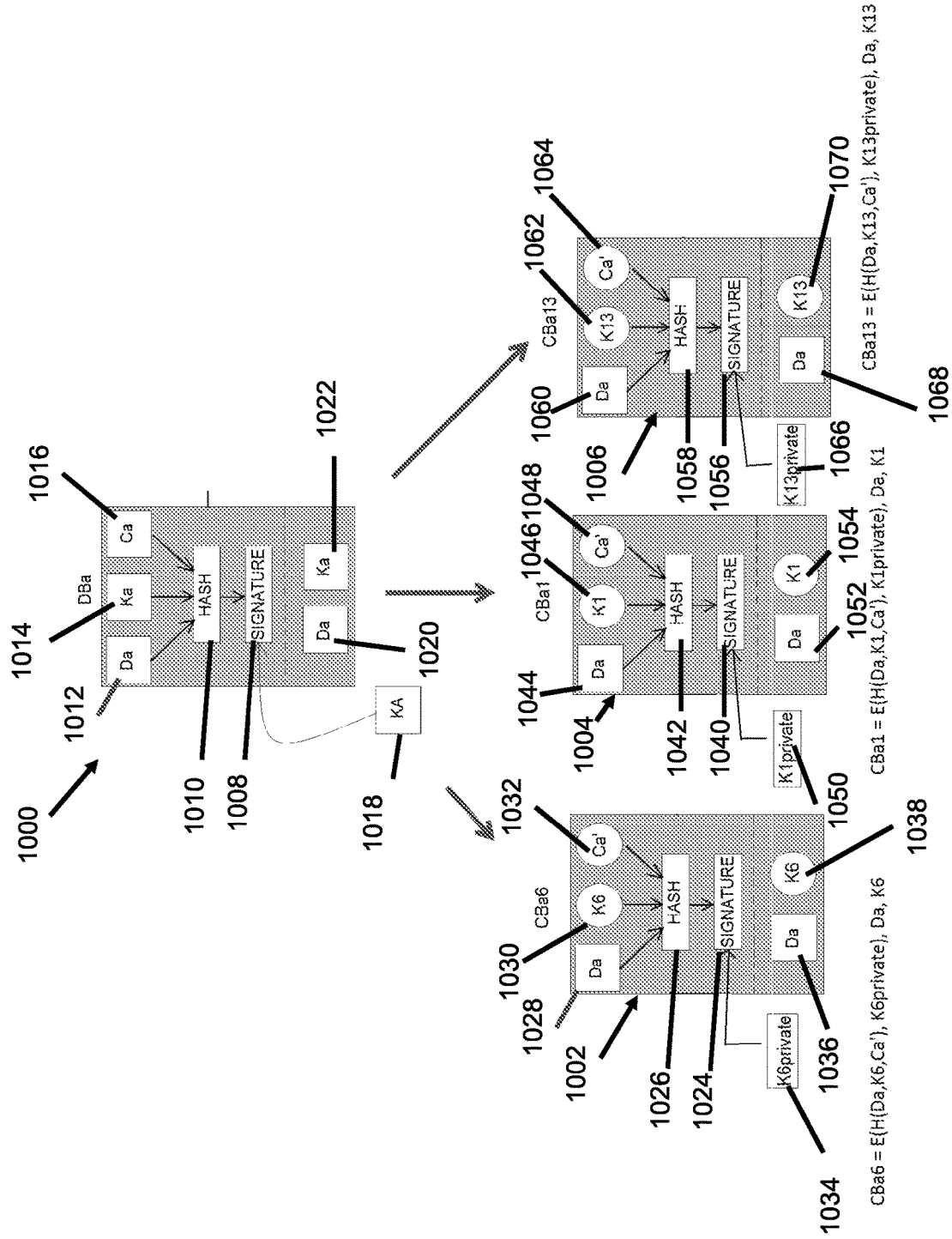
FIG. 10 shows illustrations of an illustrative data block and illustrative consensus blocks generated from the illustrative data block.

With regard to FIG. 10, illustrations of an illustrative data block 1000 and illustrative consensus blocks 1002, 1004, 1006 generated from the data block 1000 are shown. The data block 1000 may include a digital signature 1008, which may be a hash value 1010 encrypted using a private key 1018 of a network node generating the data block 1000. The hash value 1010 may be generated by hashing a data 1012, a public key 1014 of the network node generating the data block 1000, and the data certificate 1016 of the network node generating the data block 1000. The data block 1000 may further include a data 1020 and a public key 1022 appended to the digital signature 1008. It should be understood that the data 1012 and the data 1020 may refer to the same data and the public key 1014 and the public key 1022 may refer to the same public key.

The consensus block 1002 may be generated by a network node from the data block 1000. As shown herein, the consensus block 1002 may have been generated by a network node number 6 in a P2P network. The consensus block 1002 may include a digital signature 1024, which may be a hash value 1026 encrypted using a private key 1034 of the network node number 6. The hash value 1026 may be generated by hashing a data 1028 (same as data 1012) of the data block 1000, a public key 1030 of the network node number 6, and a consensus bit set data certificate 1032. The consensus bit set data certificate 1032 may be generated by setting at least one bit of the data certificate 1016 of the network node generating the data block 1000. The consensus block may further include a data 1036 (same as data 1012 and data 1028) of the data block 1000 and a public key 1038 (same as public key 1030) of network node number 6. Mathematically, the consensus block (CBa6) 1002 may be expressed in terms of data (Da) 1028, 1036; public key (K6) 1030, 1038; consensus bit set data certificate (Ca') 1032, private key (K6private) as in the following equation.

$$CBa6=E(H(Da,K6,Ca'),K6private),Da,K6$$

The consensus block 1004 may be generated by a network node from the data block 1000. As shown herein, the consensus block 1004 may have been generated by a network node number 1 in a P2P network. The consensus block 1002 may comprise a digital signature 1040, which may be a hash value 1042 encrypted using a private key 1050 of the network node number 1. The hash value 1042 may be generated by hashing a data 1044 (same as data 1012) of the data block 1000, a public key 1046 of the network node number 1, and a consensus bit set data certificate 1048. The consensus bit set data certificate 1048 may be generated by setting at least one bit of the data certificate 1016 of the network node generating the data block 1000. The consensus block may further include a data 1052 (same as data 1012 and data 1044) of the data block 1000 and a public key 1054 (same as public key 1046) of network node number 1. Mathematically, the consensus block (CBa1) 1004 may be expressed in terms of data (Da) 1044, 1052; public key (K1) 1046, 1054; consensus bit set data certificate (Ca') 1048, private key (K1private) as in the following equation.

$$CBa1=E(H(Da,K1,Ca'),K1private),Da,K1$$

The consensus block 1006 may be generated by a network node from the data block 1000. As shown herein, the consensus block 1006 may have been generated by a network node number 13 in a P2P network. The consensus block 1006 may include a digital signature 1056, which may be a hash value 1058 encrypted using a private key 1066 of the network node number 13. The hash value 1058 may be generated by hashing a data 1060 (same as data 1012) of the data block 1000, a public key 1062 of the network node number 13, and a consensus bit set data certificate 1064. The consensus bit set data certificate 1064 may be generated by setting at least one bit of the data certificate 1016 of the network node generating the data block 1000. The consensus block may further include a data 1068 (same as data 1012 and data 1060) of the data block 1000 and a public key 1070 (same as public key 1062) of network node number 13. Mathematically, the consensus block (CBa13) 1006 may be expressed in terms of data (Da) 1060, 1068; public key (K13) 1062, 1068; consensus bit set data certificate (Ca') 1064, private key (K13private) as in the following equation.

$$CBa13=E(H(Da,K13,Ca'),K13private),Da,K13$$

Figure 11:
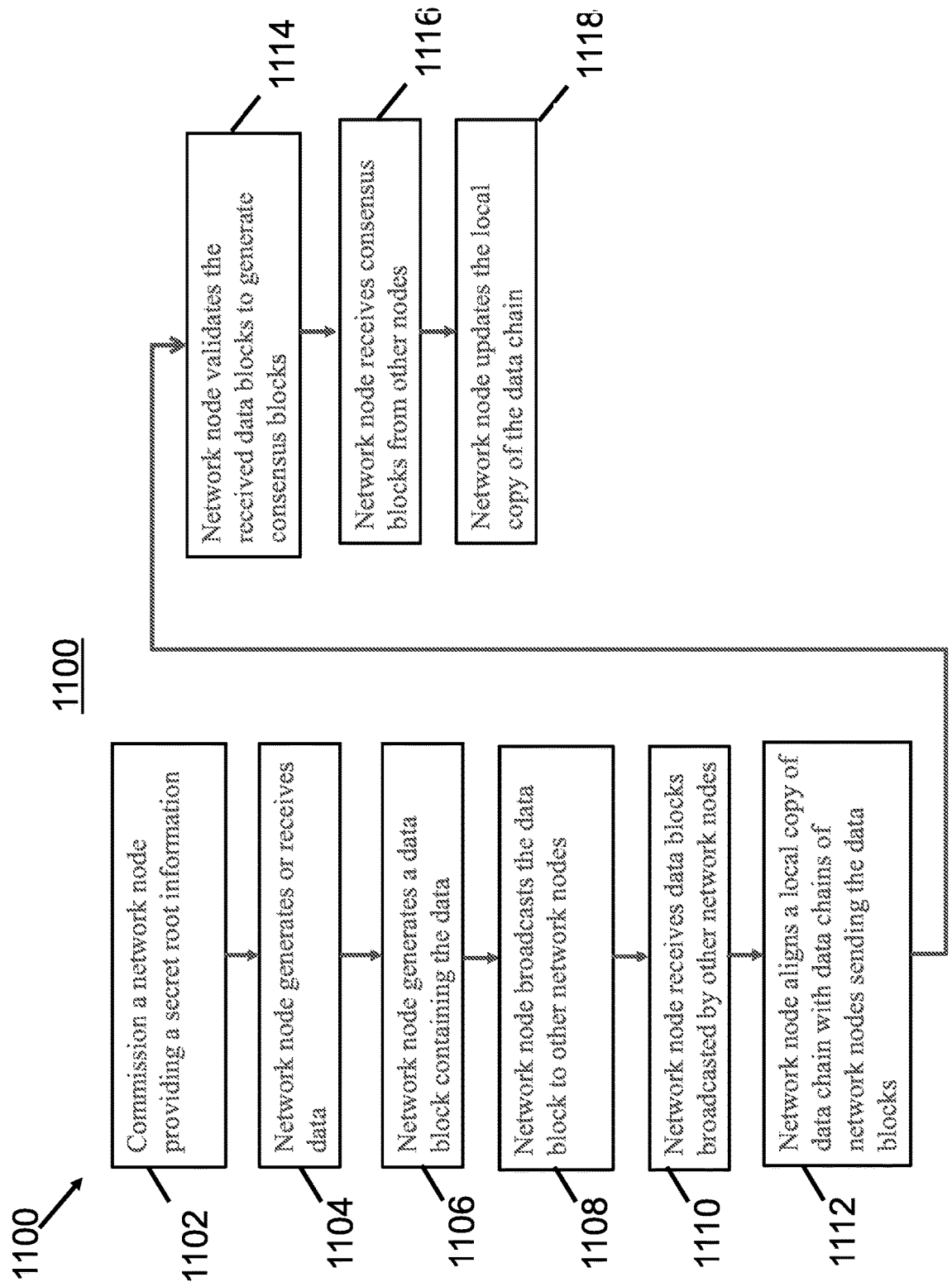
FIG. 11 is an illustrative flow diagram of a process to provide reliability and redundancy of data in a sensor network environment.

With regard to FIG. 11, an illustrative flow diagram 1100 of an illustrative process of providing data reliability and redundancy is shown. The process may begin at step 1102 in which a network node may be commissioned by providing a secret root information. In some embodiments, the secret root information may include an initial seed for an internal pseudo random number generator for the network node. In a peer to peer (P2P) network containing the network node, as all network nodes will be sharing the root information, only data generated in a certain relation to a respective secret root information may be considered trusted in the network and enabled to be shared between the network nodes. In some embodiments, the network node may be commissioned by an external device such as smartphone, a tablet, or a laptop, which may act as a commissioning node at a startup phase. Although the beginning step 1102 recites a single network node being commissioned, this is merely for the ease of explanation and multiple network nodes may be commissioned simultaneously, substantially simultaneously, or sequentially. The multiple network nodes may be commissioned by providing different secret root information to each of the network nodes. The rest of this description details the processes executed by the aforementioned commissioned node for the ease of explanation, and one should understand that these processes may executed in cooperation of other commissioned network nodes.

At step 1104, the network node may generate or receive data. If the network node is a sensor, the network node may capture environmental data based on a time trigger or an event trigger. Alternatively or additionally, the network node may receive data from another network node or another device. At step 1106, the network node may generate a data block containing the data received or generated by the network node. At step 1108, the network node may broadcast the data block to other network nodes in the P2P network. At step 1110, the network node may receive data blocks broadcasted by other network nodes in the P2P network. At step 1112, the network node may align a local copy of a data chain with the data chains of the network nodes sending the data blocks. At step 1114, the network node may validate the received data blocks to generate the respective consensus blocks, and to broadcast the respective consensus blocks to the network. At step 1116, the network node may receive consensus blocks from other nodes. If the numbers of received consensus blocks exceeds a predetermined threshold, the network node may update its local copy of the data chain at step 1118.

The aforementioned embodiments may provide a robust protection against attacks from malicious users. From a theoretical point of view, a malicious user can execute at least three different attacks: (i) try to propose a new fake data, (ii) send a false consensus, and/or (iii) send a no-consensus message. With regard to the first attack of proposing a new fake data, the malicious user may send the start of a chain or join an already existent chain. For a start of a chain, the malicious user may transmit a data block DBx=E(H(Dx, Kx, Cx), KX), Dx, Kx. This attack may fail because the malicious user cannot generate a valid Cx. For the malicious user attempting to join an existent chain by concatenating a fake data to the existent chain, the user again may not be able to generate a data with a valid Cx, and therefore the fake data may be rejected. With regard to the second attack of sending a false consensus block, the malicious user may be required to create from the message Dba=E(H(Da, Ka, Ca), KA), Da, Ka, the consensus message of CBax=E(H(Da, Kx, Ca'), KX), Da, Kx. However, this attack may fail because the malicious user may not able to create Ca'. With regard to the third attack of no-consensus message, this type of message may not be supported by the message exchange protocols in the aforementioned embodiments. Therefore, this type of attack may not be possible.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A method for providing data redundancy and reliability across plurality of network nodes, the method comprising:
commissioning a set of network nodes by providing secret root information thereto during a network commissioning phase;
generating, by a first network node of the set of network nodes, a first data block containing a cryptographic hash derived from the secret root information and data generated or received by the first network node;
broadcasting the first data block to at least a subset of the network nodes;
receiving a second data block generated by a second network node of the network nodes;
generating a first consensus block based upon verifying the second data block;
broadcasting the first consensus block to at least a subset of the set of network nodes;
receiving, by the first network node, respective consensus blocks from one or more other network nodes of the network nodes;
updating, by the first network node, a data chain in response to determining that the number of consensus blocks including the first consensus block exceeds a threshold; and
wherein the second data block includes data generated or received by the second network node and a first consensus bit having a first value, and the first consensus block includes the data that was generated or received by the second network node and a second consensus bit having a second value different from the first value.

2. The method according to claim 1, further comprising:
aligning a data chain stored by the first network node with the second data block.

3. The method according to claim 2, wherein aligning the data chain with the second data block comprises:
requesting at least one block in a local data chain of the second network node in response to determining that a second consensus block cannot be chained to the data chain.

4. The method according to claim 1, wherein the first data block includes a node ID, a payload, a sequence number, a nonce, and a time stamp.

5. The method of claim 1, wherein the first data block includes a data certificate containing a node ID, next nonce, time rights, and a consensus bit.

6. The method according to claim 5, further comprising changing the consensus bit when a consensus block is identified.

7. The method of claim 1, wherein the first network node is a sensor.

8. The method according to claim 1, wherein the verifying of second data block comprises decrypting an encrypted hash value in the second data block using a public key in the second data block.

9. The method according to claim 1, wherein updating the data chain includes appending the first consensus block to the data chain.

10. The method according to claim 1, further comprising commissioning each of the network nodes by providing different secret root information to each of the network nodes.

11. A system for providing data redundancy and reliability, the system comprising:
a plurality of network nodes, a set of network nodes being commissioned by receiving secret root information during a network commissioning phase;
a first network node of the set of network nodes including a processor configured to generate a first data block containing a cryptographic hash derived from the secret root information and data generated or received by the first network node;
the first network node utilizing a communications protocol to:
broadcast the first data block to at least a subset of the network nodes;
receive a second data block generated by a second network node of the network nodes;
the processor further configured to:
generate a first consensus block based upon verifying the second data block;
broadcast the first consensus block to at least a subset of the network nodes;
receive respective consensus blocks via said communications protocol from one or more other network nodes of the network nodes;
update a data chain in response to determining that the number of consensus blocks including the first consensus block exceeds a threshold; and
wherein the second data block includes data generated or received by the second network node and a first consensus bit having a first value, and the consensus block includes the data that was generated or received by the second network node and a second consensus bit having a second value different from the first value.

12. The system according to claim 11, wherein the processor is further configured to:
align a data chain stored by the first network node with the second data block.

13. The system according to claim 12, wherein the processor is further configured to:
request at least one block in a local data chain of the second network node in response to determining that a second consensus block cannot be chained to the data chain.

14. The system according to claim 11, wherein the first data block includes a node ID, a payload, a sequence number, a nonce, and a time stamp.

15. The system of claim 11, wherein the first data block includes a data certificate containing a node ID, next nonce, time rights, and consensus bit.

16. The system according to claim 15, wherein the processor is further configured to change the consensus bit when a consensus block is identified.

17. The system according to claim 11, wherein the first network node is a sensor.

18. The system according to claim 11, wherein the processor is further configured to decrypt an encrypted hash value in the second data block using a public key in the second data block.

* * * * *